ALTERNATING CURRENT RECEIVERS

Filed Dec. 27, 1956 5 Sheets-Sheet 1

INVENTORS.
LIONEL R. F. HARRIS,
& FRED N. MARTIN,
BY
Hall & Houghton
ATTORNEY

ALTERNATING CURRENT RECEIVERS

Filed Dec. 27, 1956 5 Sheets-Sheet 2

INVENTORS,
LIONEL R. F. HARRIS,
& FRED N. MARTIN,
BY Hall & Houghton
ATTORNEY

INVENTORS,
LIONEL R.F. HARRIS,
& FRED N. MARTIN,
BY Hall & Houghton
ATTORNEY

July 24, 1962 L. R. F. HARRIS ET AL 3,046,345

ALTERNATING CURRENT RECEIVERS

Filed Dec. 27, 1956 5 Sheets-Sheet 4

INVENTORS
LIONEL R.F. HARRIS
& FRED N. MARTIN,
BY Hall & Houghton
ATTORNEY

July 24, 1962 L. R. F. HARRIS ET AL 3,046,345

ALTERNATING CURRENT RECEIVERS

Filed Dec. 27, 1956 5 Sheets-Sheet 5

INVENTORS,
LIONEL R. F. HARRIS,
& FRED N. MARTIN,
BY Hall & Houghton
ATTORNEY 3,046,345
Patented July 24, 1962

3,046,345

ALTERNATING CURRENT RECEIVERS

Lionel Roy Frank Harris, Kenton, and Fred Nicholas Martin, Eastcote, Pinner, England, assignors to Her Majesty's Postmaster General, London, England Filed Dec. 27, 1956, Ser. No. 630,912
Claims priority, application Great Britain Jan. 4, 1956
9 Claims. (Cl. 179—15)

Figure 1:
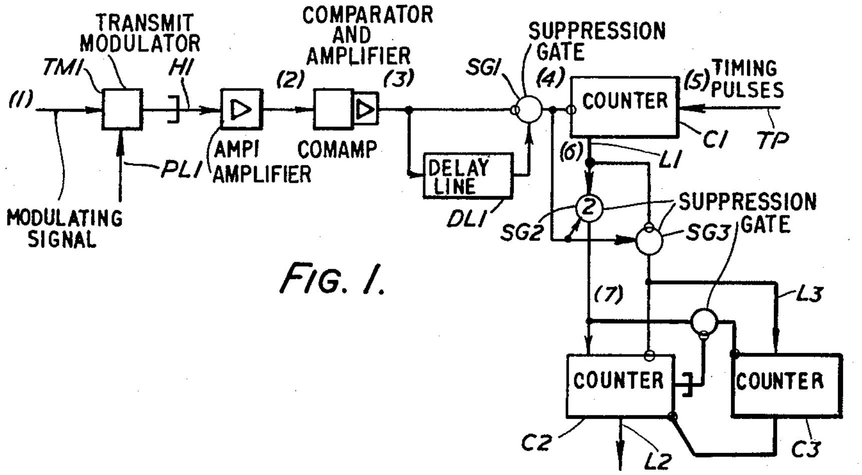

This invention relates to alternating current receivers and has particular although not exclusive reference to receivers for voice frequency signals used for the transmission of information in communication systems such as telephone systems.

An object of the present invention is to provide for the reception of alternating current signals transmitted from a plurality of sources, any number of which may be transmitting at the same time, by apparatus which is common to all the sources.

Time division multiplex methods may be used to present information from a number of sources on a common lead and may also be used to store the presented information, to carry out logical operations thereon and to store and indicate detections made therefrom.

According to the present invention an alternating current signal receiver for receiving signals from a source of signals comprises means for deriving time-spaced pulses in which the time intervals between the pulses are dependent upon said signals, means for comparing the intervals with predetermined time intervals and further means for providing an indication when there is coincidence between an interval and a predetermined time interval.

In an alternating signal current receiver for receiving signals from a plurality of sources in which each source whose signals are being received is characterised by a pulse train there are means for deriving time-spaced pulses in which time intervals between the pulses of a pulse train characteristic of a source are dependent upon the signals received from the source, means for comparing said intervals with predetermined time intervals, and further means for providing an indication when there is coincidence between the time interval and the predetermined time interval.

The predetermined time intervals may approximate to the period of a single signalling frequency.

When the receiver receives compound signals of two signalling frequencies, the time intervals approximate to the period of the mean of the two signalling frequencies and the receiver also provides pulses separated by time intervals which approximate to half the period of half the difference between two signalling frequencies.

Means may be provided for comparing an interval with a plurality of predetermined intervals in order to determine if one of a number of possible signals is being received.

A source may be characterised by a pulse train for a period during which a signal from this source is being detected, but at other times this pulse train is used by other sources.

In a particular embodiment of the invention an alternating current receiver for receiving signals from a plurality of sources comprises means for modulating a pulse train characteristic of a source transmitting signals by alternating current signals from that source, and means for deriving from the modulated pulse train pulses separated by time intervals dependent upon the signals received from this source. The intervals may be derived by comparing the modulating pulses with a standard which may correspond to an unmodulated pulse and by selecting all modulated pulses which differ in a predetermined manner from the standard and deriving therefrom indications of the relevant time intervals.

The standard may be the same and constant for all sources, or, for example, a standard may be derived for each source pulse train, or the standard may be derived from the previous pulse of the train.

Figure 2:
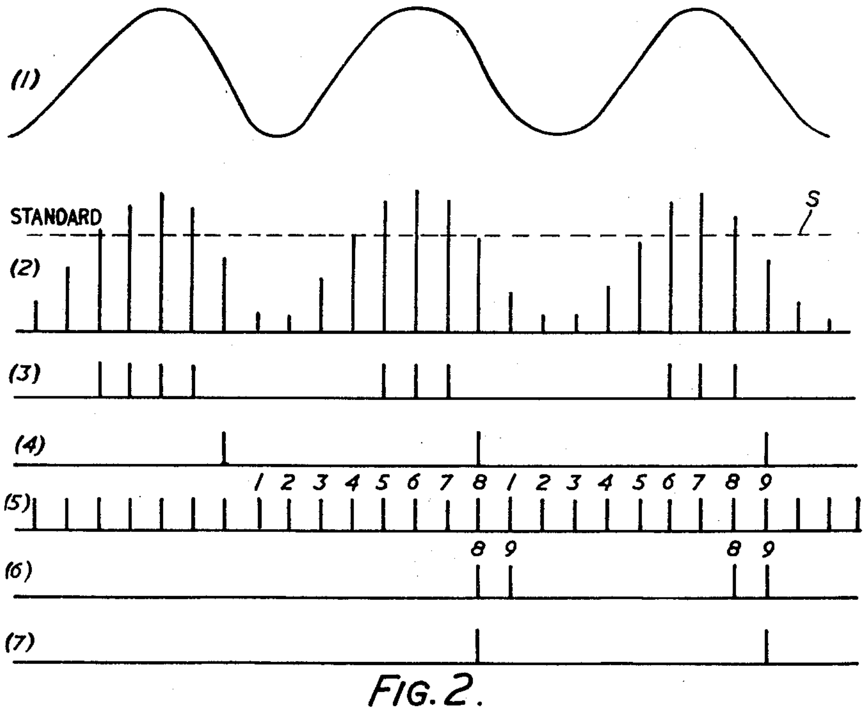
Figure 3:
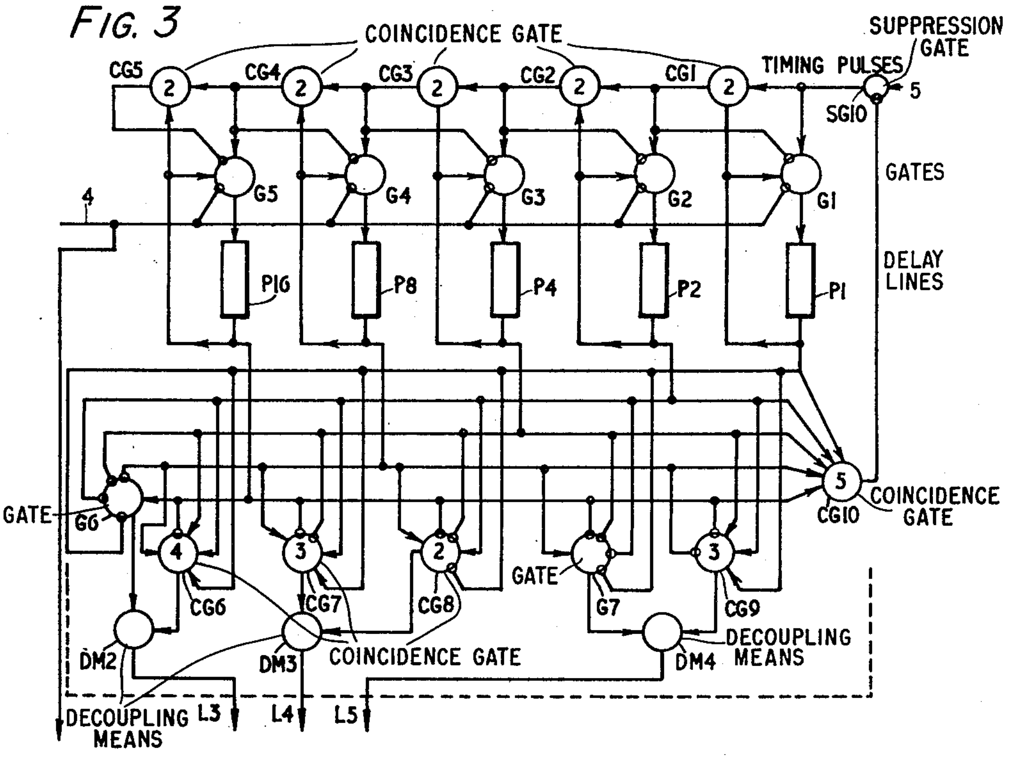
Figure 3A:
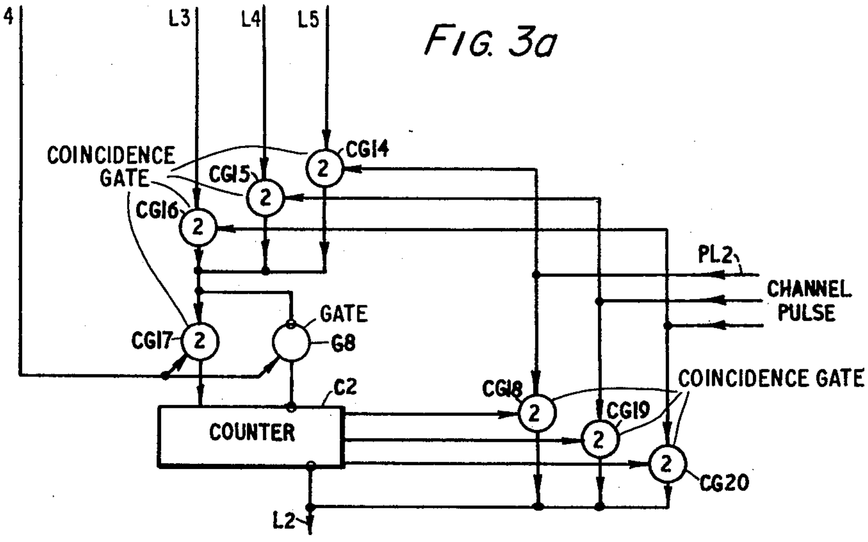
Figure 4:
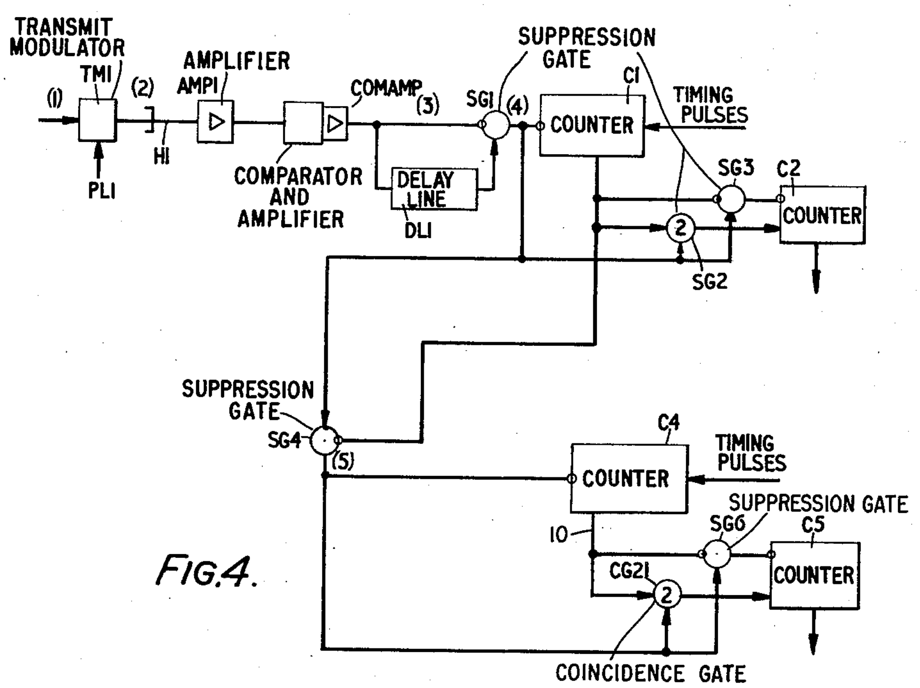
Figure 6:
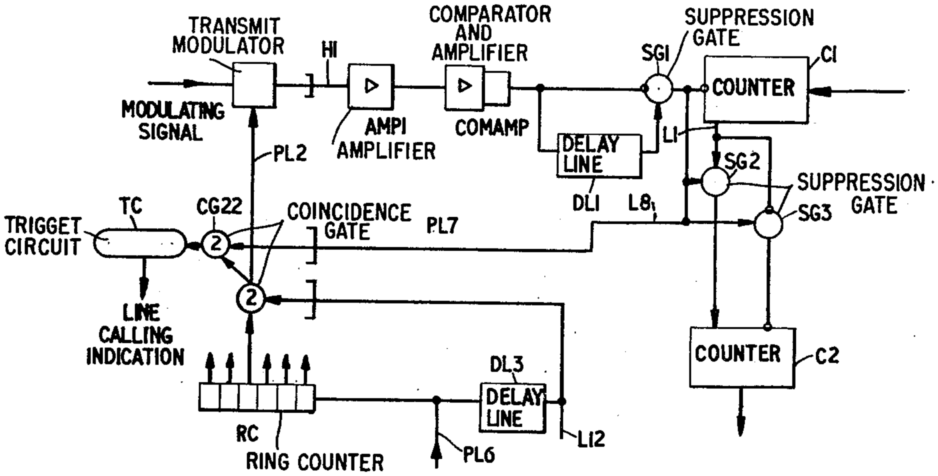
Figure 5:
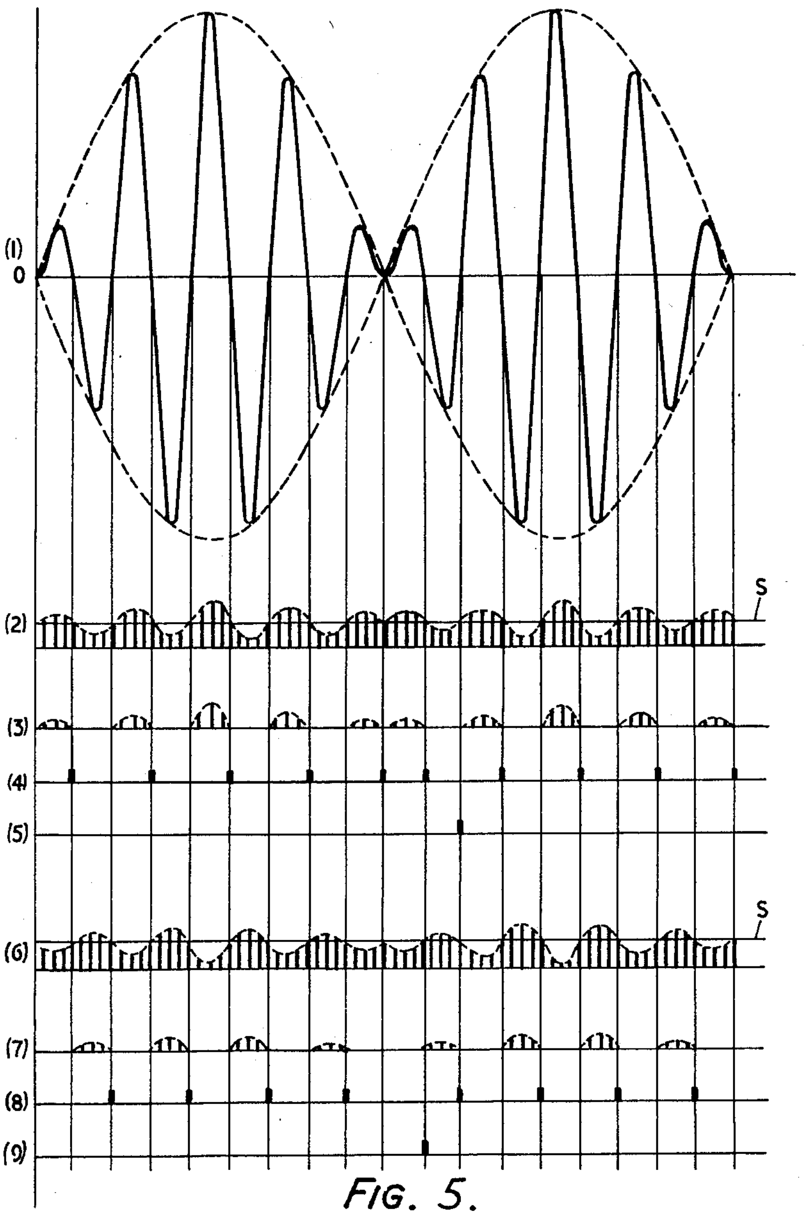
Figures 3B, 7:
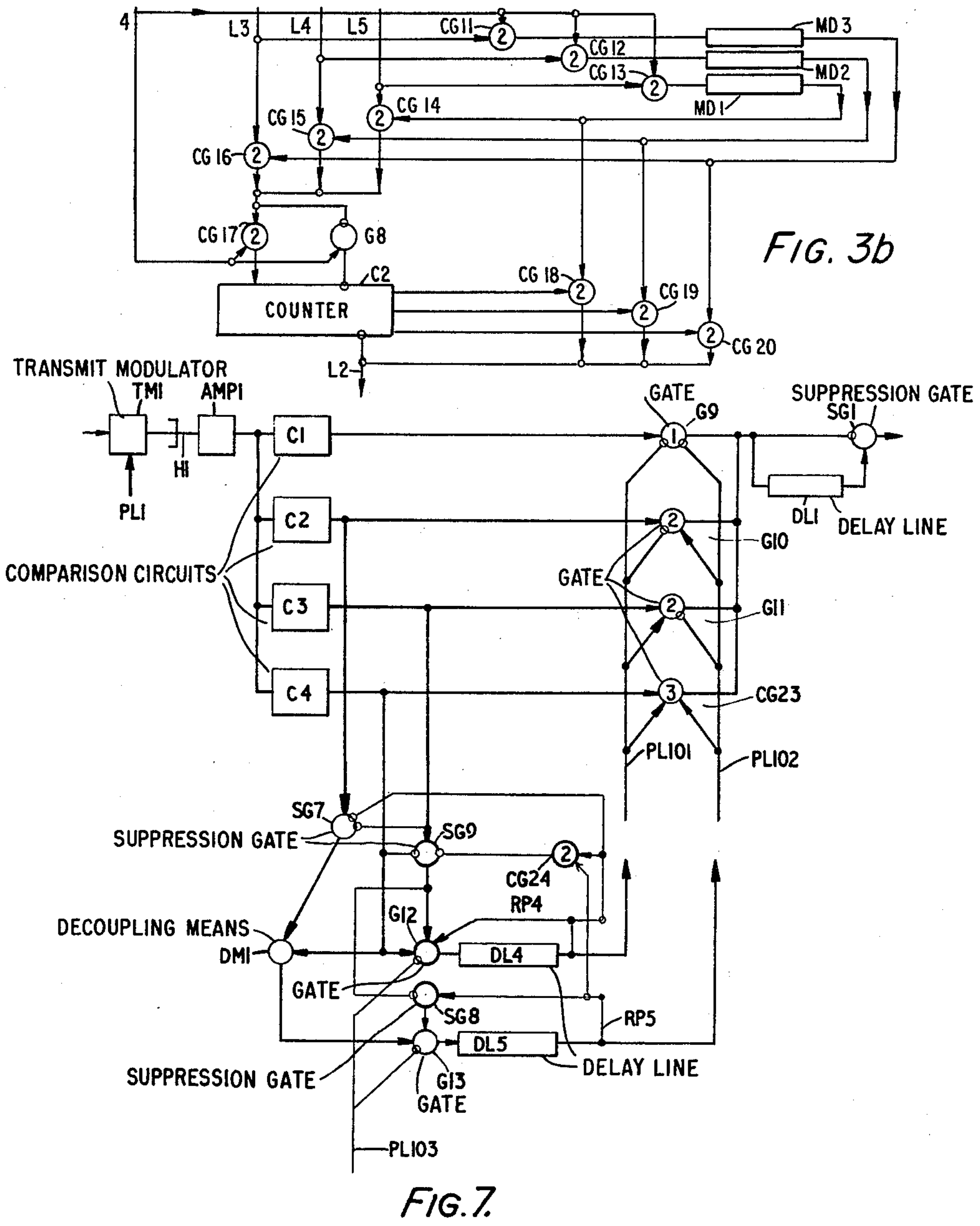

As examples of the invention, various embodiments thereof will now be described in greater detail with reference to the accompanying drawings of which:

FIG. 1 is a circuit diagram in logical form of one embodiment,

FIG. 2 shows the waveforms appearing at selected points on the circuit of FIGURE 1, FIG. 3 with either FIG. 3(*a*) or FIG. 3(*b*) shows in logical form parts of further embodiments of the invention, FIG. 4 is a circuit diagram in logical form of another embodiment suitable for receiving compound signals of two frequencies, FIG. 5 shows the waveforms appearing at selected points on the circuit of FIGURE 4, FIG. 6 is a circuit diagram in logical form of a further embodiment, and FIG. 7 is a circuit diagram in logical form of parts of other embodiments.

FIGURE 1 shows a simple form of detector for detecting alternating currents of one frequency, for example a voice frequency, which may be transmitted from a number of sources. A voice frequency signal from a source (not shown) is applied to a modulator TM1 where the signal amplitude modulates a pulse train applied to TM1 over lead PL1. The pulse train is characteristic of the source transmitting the signal. Modulated pulses from modulators associated with other sources transmitting signals are applied to a common highway H1 connected to an amplifier AMP1 whose output is applied to a comparator and amplifier COMAMP which delivers to its output only those modulated pulses whose amplitude exceeds a standard value which may be determined, for example, by the bias applied to a short grid base switching pentode.

Thus, for any one source, waveform (1) shown in FIG. 2 applied to TM1 causes modulated pulses as indicated by waveform (2), FIG. 2, to appear on the common highway H1 and selected pulses, whose amplitude is greater than the standard value indicated by dotted line S, illustrated by waveform (3) to appear at the output of COMAMP.

Depending upon the value of the standard, the output of COMAMP will consist of one or several pulses and these are applied to a delay line DL1 of time delay equal to the pulse repetition time of the pulse train applied on PL1. The output of COMAMP is also applied as an inhibition to suppression gate SG1. Thus, during each cycle of the modulating signal there appears on the output of SG1 a single pulse which is the delayed version of the single pulse or the last of the several pulses appearing on the output of COMAMP. The single pulse is coincident with the first pulse in a cycle of the modulating signal which fails to exceed the standard level in amplitude, as shown by waveform (4) FIG. 2.

If the modulating signals is a pure tone, the average rate at which pulses will appear on the output of SG1 will equal the frequency of the tone. Thus, if a 1200 c./sec. tone is being transmitted from a source and the pulse repetition frequency of the pulse train on lead PL1 is 10 kc./sec. the pulses transmitted from SG1 will occur every 8.333 pulses of the pulse train on PL1. That is to say, if a pulse appears on the output of SG1 at one pulse-time the next pulse will appear either 8 or 9 pulse times later. If a sequence of pulses is received in which each pulse occurs 8 or 9 pulse times after the previous pulse received the signal received must be of a frequency of between 1250 and 1111 c./sec. The ouput of SG1 is connected to a counter C1 which counts pulses of each of the pulse trains characterising the sources. C1 operates on a time division basis so that the count for each pulse train is made independently in a manner similar to that described in more detail below with reference to FIGURE 3. The pulses to be counted are applied as a timing pulse train over lead TP. Waveform (5) shows those timing pulses relevant to the source shown and counter C1 is reset for any pulse train by a pulse on the output of SG1. On output lead L1 of counter C1 are indicated those pulses which occur 8 and 9 pulse times after the counter was last reset and which are shown in waveform (6). The pulses on L1 which are coincident with pulses from SG1 are passed via gate SG2 to counter C2 which is limited to count a predetermined number of coincidences for each source. Whenever this number has been counted for a source, counter C2 provides an output on lead L2. If a pulse on the output of SG1 does not coincide with a pulse on L1, counter C2 is reset via gate SG3. Thus a pulse on L2 indicates that a predetermined number of cycles of a signal having a frequency of between 1250 and 1111 c./sec. has been received from the source characterised by the pulse train including the pulse which appears on L2.

This arrangement is adequate for any one-V.F. signalling system and considerable economies are achieved since all the apparatus apart from the modulators is made common to a large number of sources.

In the arrangement already described, it was stated that a signal having a frequency of between 1250 c./sec. and 1111 c./sec. was being received. This is a frequency band of 139 c./sec. and the circuit may be considered to have an accuracy of 139/1200 which is about 11%. This accuracy increases with the numbers of the count made by counter C1. Thus, if the frequency of the signal is dropped from 1200 to 120 c./sec. the numbers of the count would be 83 and 84 instead of 8 and 9 and the frequency band would be 120.5–119.1=1.4 c./sec. The accuracy is then 1.4/120 which is about 1.2%. In fact, the accuracy obtained is approximately equal to the inverse of the numbers of the count. With any signal frequency, the accuracy can be increased by increasing the count either by increasing the sampling rate or by comparing the time taken to count a larger number of pulses on the output of SG1. Thus the accuracy of 1.2% may be achieved with the 1200 c./sec. signal if it is arranged that only every tenth pulse from SG1 resets counter C1. Then as in the above case when the frequency of the signal was 120 c./sec. the numbers of the count would be 83 and 84 and the frequency band would be in the range 1205 to 1191 cycles per second.

The count made by counter C2 does not affect the accuracy of the measurement of the received signal but only its duration which will be important if the V.F. signals used are subject to speech, noise, or other imitation.

In the arrangement of FIG. 1, the counter C2 is reset via SG3 if any pulse from SG1 occurs in a pulse position not corresponding to the required signal, i.e. there is not a coincidental pulse on L1. The effect of noise superimposed on a signal, or the presence of other extraneous low level signals may cause the unnecessary resetting of counter C2 and it is possible to arrange that counter C2 is only reset after some predetermined number of false pulses from SG1 have been counted. To count false pulses, further circuitry must be added. Such additional circuitry is shown in heavy lines and comprises a counter C3 operated via lead L3 joined to gate SG3, the counter C3 being reset by the first pulse into counter C2. Counter C3 resets counter C2 after a number of pulses on lead L3 have been applied to counter C3 after counter C3 has started counting. This technique would tend to increase the length of signal required to be transmitted from the source if noise were present but would make the reception of the signal in such circumstances more probable.

FIG. 1 shows apparatus required to receive the same fixed frequency on any channel. If different signalling frequencies are required to be received on different channels the output lead L1 is duplicated in counter C1 as shown in FIG. 3.

FIG. 3 is basically a counting circuit of counter C1 in which timing pulses are applied over lead 5 to a gate G1 and a coincidence gate CG1. The first timing pulse received is thus stored in delay line P1 whose output is connected to CG1. The second timing pulse thus passes through CG1 and is stored in P2 whilst at the same time the first pulse is deleted from P1 by the output of CG1 which is supplied as an inhibition to gate G1.

The third timing pulse is stored in P1 in a manner similar to that of the first pulse so that the first pulse is stored in both P1 and P2. The fourth pulse is gated through CG1 and CG2 and is stored in P4 while the outputs from CG1 and CG2 delete the third pulse stored in P1 and P2.

The fifth pulse is stored in P1 in a manner similar to that of the first pulse so that the fifth pulse is stored in both P1 and P4. The sixth pulse deletes the fifth pulse from P1 and a pulse is inserted into P2. Thus, the sixth pulse is stored in P2 and P4. The seventh pulse is stored in P1, P2 and P4 whilst the eighth pulse deletes the seventh pulse in these delay lines and a pulse is stored in P8. The succeeding pulses are stored in a similar fashion in a characteristic combination of one or more of the delay lines.

The counter just described, which replaces counter C1 in FIG. 1, is shown in FIG. 3 as having three output leads L3, L4 and L5 one of which is marked when a particular frequency is detected. Thus, lead L3 is marked when, for example, a frequency of 600 c./sec. is detected which corresponds with a count of either 15 or 16 timing pulses, i.e. on the 16th or 17th timing pulse after the counter was reset. It will be seen that storage in P1, P2, P4 and P8 or storage in P16 produce an output on L3 via DM2.

When pulses are stored in P1, P2 and P8 producing coincidence in gate CG7 an output is produced on lead L4. An output is also produced on lead L4 when pulses are stored in P2 and P8 thus producing coincidence in gate CG8 connected to L4. An output on lead L4 which corresponds with a count of 10 and 11 may be equivalent to a frequency of say 750 c./sec.

An output on lead L5 is produced by a pulse stored in P1, P2 and P4. An output on L5 is also produced by a pulse stored in P8. An output on L5 which corresponds with a count of either 7 or 8 may be the equivalent of a frequency of say 1200 c./sec.

When all stores are occupied, i.e. after 31 timing pulses, the timing pulses are inhibited in SG10 so that counter C1 of FIG. 3 is reset by pulses applied over lead 4 only in a manner similar to that described above relative to FIG. 1.

Having detected a particular frequency it is now necessary to indicate which source is transmitting the frequency and FIG. 3(*a*) shows the circuitry necessary for the case in which the frequencies which any given channel can transmit are fixed while FIG. 3(*b*) shows the circuitry for the case in which the frequencies are variable. FIG. 3 is used with either FIG. 3(*a*) or FIG. 3(*b*), connections to leads 4, L3, L4 and L5 being made as shown.

In the first case where the frequencies are fixed, an output on, say, lead L5 coincides in CG14 with a pulse train applied via PL2 which is coincident with the pulse train applied to the modulator TM1 via PL1 in FIG. 1. PL2 carries the pulse trains associated with those sources on which a signal of 1200 c./sec. is expected. The output of CG14 is applied via CG17 where coincidence occurs with a pulse on lead 4 to counter C2 which is similar to counter C2 of FIG. 1. When a given number of coincidences has been counted in C2 an output is applied to CG18 thus permitting the pulse train on PL2 to pass to output lead L2 and also to reset C2.

In the variable frequency case of FIGS. 3 and 3(*b*), it is not known what frequencies to expect from particular sources. Thus, the output of L5 is applied to coincidence gate CG13 where coincidence is found with a pulse on lead 4. The output of CG13 is stored in a memory device MD1 whose output is applied to CG14 which thus gates the output on L5 to CG17. The output of MD1 is also applied to CG18 which together with C2 operates in the manner described above. FIG. 3(*b*) also shows other memory devices MD2 and MD3 with associated coincidence gates CG11 and CG18 for leads L3 and L4 respectively. If a pulse appears on lead 4 which does not coincide with a pulse applied to CG17, the pulse of lead 4 is transmitted via G8 to reset the counter C2 and also to delete the pulse train from MD1, MD2 or MD3 so that the receiver can then receive signals of a frequency different from that which first operated one of the memory devices.

So far, only single signalling frequencies have been discussed but more complex waveforms may be detected by using more complicated techniques. In particular, the presence of a two-frequency compound signal with components of substantially equal amplitude and of suitable frequency can be detected. The compound signal may be represented by $A \sin 2\pi f_1 t + A \sin 2\pi f_2 t$ which is equivalent to $$2A \sin 2\pi\left[\frac{f_1+f_2}{2}\right]t \cos 2\pi\left[\frac{f_1-f_2}{2}\right]t$$

This corresponds with a signal of frequency $$\frac{f_1+f_2}{2}$$

whose envelope varies with a frequency of $$\frac{f_1-f_2}{2}$$

Using techniques similar to those described above in the case of one V.F. signals, the presence of $$\frac{f_1+f_2}{2}$$

signal may be detected. However, the phase of this signal will change by $\pi$ every half-cycle of the envelope. During each half-cycle of the envelope changes of sign in one or both directions may be detected and compared with predetermined time intervals, as described above, in order to detect the presence of the signal $$\frac{f_1+f_2}{2}$$

During the next half-cycle of the envelope these changes may again be detected but will occur half a period of the $$\frac{f_1+f_2}{2}$$

signal out of phase with those in the first half-cycle. The time intervals between these changes in phase may be compared with a standard time interval in order to detect the envelope frequency. If both these comparisons give appropriate results, the presence of the compound signal may be indicated.

Most conveniently, several cycles of the $$\frac{f_1+f_2}{2}$$

waveform occur in each half-cycle of the envelope which implies that $$\frac{f_1+f_2}{2}$$

is greater than, say $2(f_1-f_2)$. This condition is met if $$5f_2>3f_1 \text{ or } \frac{f_1}{f_2}<\frac{5}{3}$$

It is found in practice that most V.F. signalling systems can be adequately operated using signals which fulfill this condition. For example, it is known that combinations of two out of five frequencies may be used for the transmission of digital information between registers. On account of intermodulation products it is useful to employ frequencies which are odd multiples of a single frequency and the frequencies 1125, 1175, 1225, 1275 and 1325 c./sec. are suitable from this point of view. Also the greatest ratio of any two of these frequencies is $$\frac{1325}{1125}$$

which is considerably less than $$\frac{5}{3}$$

In fact these two frequencies would give more than five cycles for the mean frequency of each half-cycle of the envelope.

FIG. 4 is a circuit diagram in logical form of a receiver for detecting a compound V.F. signal of frequencies $f_1$ and $f_2$. Part of the circuit is identical with that of FIGURE 1. The compound signal is applied to a modulator TM1 where it amplitude-modulates a pulse train characterising the source from which the signal emanates and applied over PL1. Modulated pulses from modulators such as TM1 are applied to the common highway H1 connected to amplifier AMP1. The output of AMP1 passes to comparator-amplifier COMAMP on the output of which appears only those modulated pulses whose amplitude exceeds a standard value. Thus, on the output of COMAMP appear only those pulses whose amplitude exceeds the standard and appearing only during the positive periods of the compound signal, i.e. for periods of $$\frac{1}{f_1+f_2}$$

seconds separated by equal periods during which no pulses appear.

FIG. 5 shows the waveforms appearing at the numbered points in the circuit of FIG. 4. It will be seen that for any one source, the compound signal is represented by waveform (1), and the output of TM1 by waveform (2).

The output of COMAMP is applied to delay line DL1 of time delay equal to the repetition frequency of the pulse train characterising the source and as an inhibition to gate SG1. This produces, in a manner similar to that described above with reference to FIG. 1, on the output of SG1, a single pulse which is a delayed version of the single pulse of the last of the several pulses appearing on the output of COMAMP. The single pulse is coincident with the first pulse in a cycle of modulating signal which fails to exceeds the standard level in amplitude, and is shown by waveform (4), FIG. 5.

The output of SG1 is applied to counter C1, which is similar to counter C1 of FIG. 1, to which is also applied a train of timing pulses of the same repetition frequency as that of the pulse train applied to PL1. Counter C1 is arranged to give consecutive output pulses on lead L1 after a count which is predetermined to include a range of values of $$\frac{f_1+f_2}{2}$$

as described above for the one frequency case. The operation of gates SG2 and SG3 and counter C2 is similar to that of those components described above with reference to FIGS. 1 and 2.

The pulses on the output of gate SG1 will be equally time-spaced during each half-cycle of the envelope of waveform (1) FIG. 5 which varies at the rate of $f_1-f_2$. At minimum values of envelope amplitude, a change of sign occurs in the instantaneous value of waveform (1) FIG. 5 the result of which is that the time interval between adjacent pulses from SG1 will be increased or decreased by 50%. Thus if the output of SG1 is applied to suppression gate SG4 to which lead L1 is applied as an inhibition, pulses will appear on the output of SG4 only at times when the envelope of waveform (1) FIG. 5 passes through a minimum, this is shown by waveform (5) FIG. 5.

The output of SG4 is applied as a reset to a counter C4 to which timing pulses having the same repetition frequency as the pulse train of PL1 are fed, these producing consecutive pulses on output lead 10 of counter C4 after a count which is predetermined to include a range of values of $$\frac{f_1-f_2}{2}$$

as described above. The operation of gates SG6 and CG21 is similar to that of gates SG3 and SG2 respectively while counters C1 and C4 operate in like manner.

Thus, after a predetermined number of counts in counters 2 and 4, the presence of a compound signal comprising frequencies $f_1$ and $f_2$ can be determined by the appearance of coincident pulses on the outputs of C2 and C5.

FIG. 5 repeats waveforms (2)—(5) for the phase reversal referred to above as waveforms (6)—(9) respectively.

If the two components of the compound signal are of amplitudes A and B the signal can be represented as follows:

$$A \sin 2\pi f_1 t + B \sin 2\pi f_2 t = A \sin 2\pi f_1 t + A \sin 2\pi f_2 t + (B-A) \sin 2f_2 t = 2A \sin 2\pi \frac{f_1+f_2}{2} t \cos 2\pi \frac{f_1-f_2}{2} t + (B-A) \sin 2\pi f_2 t$$

The second term arises from the unequal amplitudes and must be sufficiently small to include the change in phase to be detected at the points of minimum envelope amplitude.

In practice it would be possible to detect any pair of frequencies using techniques similar to those described since any pair of frequencies will have waveform characteristics which are individual to the combination of frequencies. The detection of such signals may involve increased sensitivity and accuracy of the comparison apparatus but the use in practice of such signals is unlikely. This is particularly true if the two frequencies are of greatly different amplitude and/or frequency.

In some telephone systems employing pulse channels for the transmission of speech and other signals—to which the present invention is readily adapted—the external lines which may be regarded as sources of V.F. signals—such as V.F. signalling junctions—are not permanently associted with a pulse channel. In the system described in British patent specification No. 781,561 a pulse channel is allocated to a line only when the line is required to take part in a connection. In such a system a V.F. junction would call for connection by sending a V.F. signal to a V.F. receiver on the junction which would indicate that the line required connection through the exchange. By incorporating the present invention such V.F. receivers are no longer required as the time division multiplex receiver is used instead. This requires that a pulse channel or pulse channels not in use must occasionally be allocated to those lines using V.F. calling signals in order to allocate to them a channel with which any V.F. signal on the line may be detected in the common V.F. receivers.

FIG. 6 shows an embodiment in which a plurality of sources, of which one is shown, are connected by modulators to a common detecting apparatus of the form shown in FIG. 1. In FIG. 6, test pulse trains are applied to the modulators of a number of sources in turn. A ring counter RC is driven via lead PL6 from a source of timing pulses (not shown). Each source is associated with a different output of the ring and when this output is energised, the pulse train is applied to the modulator of that source. If a V.F. detection is made with the test pulse train, a pulse of the train is passed to apparatus provided for the source whose ring output is energised and this is used to give a direct indication, for example using a trigger, that a V.F. signal has been received from the source. Thus, in FIG. 6, the detection of a calling condition causes the test pulse train of a source in this condition to be applied via lead PL7 to coincidence gate CG22 whose output is applied to operate trigger TC1 individual to the source and which provides a "line calling" indication.

This arrangement is capable of considerable extension and variation being particularly relevant to the detection of V.F. calling signals in telephone switching systems. If this is its purpose, the indication that a V.F. condition has been detected may be derived in a variety of ways. The appearance of a pulse of the train on the output of SG1 indicates that some signal is present on the line and this may be adequate, since a junction line for example will normally be quiet until a calling signal is sent. Thus the output of SG1 could be communicated to PL7 as is shown by the dotted line L8.

Alternatively the output of SG2 could be used since this indicates that one cycle of the required signal has been received. Thus, the output of SG2 could be applied to lead PL7. A further alternative is the output of counter C2 to lead PL7.

The smaller the number of cycles of the pulse train which need be allocated to each source, the shorter the total scanning cycle of the lines by the test channel and the more rapidly are calling signals detected. For this reason, connection to the output of SG1 is preferred on lines which are not noisy. The ring counter could then be stepped by timing pulses on PL6 having about the same frequency as the calling signal.

Since when a timing pulse steps the counter, successive pulses of the test pulse train are used for different sources, false indication on the "V.F. condition detected" lead is possible. Depending upon which of the three leads L8, L9 and L10 is used to give the output the technique for preventing such a false indication from operating the trigger associated with this source will vary. If L8 is used, the first pulse after the timing pulse can be inhibited on L8. If L9 is used the timing pulse can set counter C1 to a higher number than that required on the counter output and if L10 is used it would be sufficient to reset counter C2.

If the detection of the calling signal merely involves the detection of a change from above to below the standard and the identification of the actual frequency is not required it is unnecessary to sample the signal at a frequency greater than the frequency of the V.F. calling signal. A sampling frequency of at least twice the modulating frequency would be required if each cycle of a one V.F. signal was to be detected. The change from above to below the standard could be detected, for example, by two pulses of the test pulse train separated by several cycles of the signal or of the pulse train. Most conveniently, the ring counter of FIG. 6 may be operated by a version of the allocated pulse applied via lead L12 and delayed by a little over the test pulse train pulse duration by delay line DL3. Each source signal is then sampled over $n$th pulse of the test pulse train where $n$ is the total count of the ring counter. The delay line DL1 is then made equal to *n* times the interval between the successive test pulses so that a pulse on L8 indicates the change from above to below the standard in the interval between two samples separated by *n* times the interval between successive test pulses for the modulating signal from the pulse being sampled. With this arrangement, *n* lines are cyclically examined by the test pulse train. Other pulse trains could be used to test the signals of other sources if required.

There are many ways of carrying this feature of the invention into effect. In practice using some types of modulators the means levels will differ and the amount by which they will differ may exceed the amplitude of the modulation. In such circumstances other apparatus can be incorporated in order to determine the amplitude of each pulse, and to remember the amplitude of the previous pulse—for example using binary coding and storage techniques of the circulating type—and to detect changes in direction of the modulating waveform by suitable comparison.

FIG. 7 shows further embodiments of the invention basically identical with that of FIG. 1 and in which a calling signal is applied to modulator TM1 where it amplitude-modulates a pulse train applied to TM1 over pulse lead PL1. The amplitude modulated output of TM1 is applied, together with outputs from other modulators via the common highway H1 to amplifier AMP1. The output of AMP1 is applied to four comparison circuits C1, C2, C3 and C4 each set to a different standard or level such that a small amplitude pulse applied to their inputs gives no output from any comparison circuit. If the amplitude is increased a pulse appears on the output of C1. If the amplitude of the pulse exceeds the standard of C2, then C1 and C2 each give an output pulse, if the amplitude exceeds standard C3, then C1, C2 and C3 each give an output pulse while finally if the amplitude exceeds standard C4, C1, C2, C3 and C4 each give an output pulse. The outputs are connected to the input of delay line DL1 and suppression gate SG1 already described with reference to FIG. 1 via gates G9, G10, G11 and CG23. Gating pulses are applied to these gates over pulse leads PL101 and PL102. In the first embodiment illustrated in FIG. 7 only the connections and components just described are used. The gating pulses in the first embodiment are such that, for any one pulse train, only one of the gates is open and the comparator whose output is connected to that gate is set to the standard for the pulse train. If, for a particular train C1 is to be used, the pulse train is generated on neither of the two leads PL101, PL102. If C2 is to be used, the pulse train is generated on lead PL102 only, if C3 is to be used, the pulse train is generated on PL101 only and if C4 is to be used, it is generated on both PL101 and PL102. If the mean amplitude of each pulse train is known the appropriate standard can therefore be associated by applying the pulse train on the appropriate leads.

In a second embodiment illustrated in FIG. 7, the standard used for each pulse depends upon the amplitude of the previous pulse of the train. To achieve this the following additional components are added to the circuit just described.

The output of C2 as well as being applied to G10 is also applied as an operating stimulus to suppression gate SG7 to which the output of C3 is applied as an inhibition. The output of C3 is also applied as an operating stimulus to gate G12 whose output is applied to a delay line DL4. The output of SG7 is applied via decoupling means DM1 to a gate G13 whose output passes into delay line DL5. The output of C4 is applied to DM1 and, as an operating stimulus to gate G12. The time delays of the delay lines DL4 and DL5 are each equal to the repetition time of the pulse trains applied on leads such as PL1 and the outputs of these delay lines are connected to PL101 and PL102 respectively.

The operation of the second embodiment is as follows. Suppose that the *a* pulse of a pulse train exceeded standard C4 then the pulse passes from C4 and G12 into DL4 and from C4, DM1 and G13 into DL5 and this appears on both PL101 and PL102. The next pulse of the same pulse train will therefore use C4 as its standard. This next pulse will then set the standard for the succeeding pulse of the same train and so on.

If a pulse exceeds standard C3 but not C4, a pulse is inserted via G12 into DL4 only and so appears on PL101 only, setting C3 as the standard. If a pulse exceeds standard C2 and not C3, the pulse passes via SG7, DM1 and G13 into DL5 thus setting standard C2 for the next pulse of the same train.

If desired, the same standard can be used for a succession of pulses of the same pulse train. This is also illustrated in FIG. 7 and is achieved by converting DL4 and DL5 into recirculating delay line stores by the addition of recirculating paths RP4 and RP5. In addition suppression gate SG8 is inserted in path RP5, and suppression gate SG9 in the connection from C3 to G12. Also, an output of C4 is used to inhibit SG9 whose output is applied as an inhibition to gate SG8. The recirculation paths RP4, RP5 are connected to coincidence gate CG24 whose output is applied as an inhibition to SG9. Recirculating path RP4 is also connected as an inhibition to SG7. Finally, reset lead PL103 is connected to both G12 and G13 as an inhibition.

Suppose, with this arrangement, a pulse of a pulse train exceeds standard C2 but not C3, the output of C2 passes into DL5 via SG7 and DM1 and provides pulses on PL102 for as long as further pulses of the same pulse train do not exceed standard C3. If now, a pulse of the same pulse train exceeds standard C3 but not C4 outputs will appear from both C2 and C3. The output of C3 inhibits gate SG7 thus preventing the insertion of a pulse from C2 into DL5 and via SG8 it stops the recirculation in DL5 of the previous pulses. Further the output of C3 is stored in DL4 where it commences to circulate thus providing an output of PL101. The standard is now set to C3.

Similarly a pulse of the same pulse train which exceeds standards C3 and C4 increases the standard to C4 by inserting the pulse into DL5 and inhibiting the output of C3 at SG9. Periodically, a new standard may be set by deleting the pulses stored in either DL4 or DL5 or both but between such deletions the arrangement shown gives a standard which has not been exceeded since the preceding deletion. For example if no recognisable signal of say 1200 c./sec. is detected during a period of say 150 milliseconds this may be due to the fact that noise on the line has caused too high a standard to be set and the lack of a detectable signal in this period could cause the pulses to be deleted from their stores and the standard reset.

It will, however, be appreciated that a reduction in the incoming pulse amplitude does not result in a reduction of the standard. For example, if the standard is set to level C3 and a pulse is received whose amplitue is less than C3 but greater than C2 there is no alteration in the standard. Standard C3 is identified by the presence of the pulse of the pulse train in delay line DL4 whose output is applied via RP4 to gate SG7 as an inhibition so that the output of C2 cannot pass SG7. If, with the standard at C4, a drop in pulse amplitude occurs to less than C4 but greater than C3 there is no change in pulse storage in DL4 and DL5 since the outputs from these delay lines are passed to coincidence gate CG24 whose output inhibits SG9 thus preventing the output from C3 passing the latter and deleting the pulses from DL5 via SG8.

Other techniques may be used to determine relevant points of the modulating wavefrom and the techniques described here are only representative of the ways in which the invention could be carried into effect.

If the counter C1 has to count $n_1$ pulses it will require $\log_2 (n_1+1)$ bits of storage capacity for each channel. If counters C2 and C3 have to count $n_2$ and $n_3$ pulses respectively they similarly will require $\log_2 (n_2+1)$ and $\log_2 (n_3+1)$ bits of storage capacity for each channel. The storage may be of the delay line circulating system type in which the expensive delay-line drive and terminating units represent an appreciable proportion of the cost. Some economy in the storage may be achieved if some stages of counting are carried out by apparatus common to more than one group of sources. Using this technique in the common apparatus each pulse train in each group is allocated particular times at which information may be interchanged with the group apparatus. For counters C2 and C3 it would be possible to use some stages individual to the group and some stages common to several groups by transferring the information in the individual stages to the common counters at the appropriate information interchange times. This may be effected using techniques which are similar to those described in the specification of co-pending Patent No. 2,984,705 issued May 16, 1961 on application Serial No. 436,632 filed June 16, 1954 in the name of Lionel Roy Frank Harris.

There are thus many ways of applying the invention and it is not restricted to the reception of voice frequency signals since lower or higher frequencies may be detected using this technique with appropriate adjustment of the sampling rate and the counting apparatus.

Further, other forms of modulation than amplitude modulation can be used. Thus width and position or phase modulation may be used provided that a suitable form of comparator is also used.

We claim:

1. A receiver for the reception of alternating current signals from a plurality of sources comprising in combination means for modulating a pulse train characteristic of a source with the signals emanating from the source, amplitude comparison means for suppressing those modulated pulses whose amplitude does not exceed a predetermined value, means for deriving from non-suppressed pulses time spaced pulses whose time spacing is determined by the frequency of said signal, a source of timing pulses, a pulse counting circuit to which said source of timing pulses is applied together with said time spaced pulses, gating circuits actuated by said counting circuit for producting outputs on given counts of said time spaced pulses and a further counting circuit for counting said outputs.

2. A receiver as claimed in claim 1 and further comprising a plurality of output leads from said gating circuits, each lead representing a particular signal frequency, a delay device for each lead and a coincidence gate for each lead for receiving the output therefrom together with the output from the delay device connected to the lead.

3. A receiver as claimed in claim 1 and further comprising a plurality of output leads from said gating circuits, a coincidence gate circuit in each output lead, and a connection between each coincidence gate and the pulse trains characterising the sources.

4. A receiver for the reception of alternating current signals from a plurality of signal sources comprising in combination a plurality of pulse train sources each characterising a different signal source, means for modulating a pulse train characteristic of a source with signals emanating from the source, amplitude comparison means to which the output of each said modulator is applied, means for deriving from the output of said amplitude comparison means time spaced pulses whose time spacing is determined by the frequency of said signals, a source of timing pulses, a pulse counting circuit connected to said timing pulse source, a connection from a counting circuit to said time spaced pulse deriving means, a plurality of output leads from said counting circuit, a coincidence gate circuit in each output lead, memory devices receiving coincidence pulses from said output leads and said time spaced pulse deriving means, connections from said memory devices to said coincidence gate circuits, and a further counting circuit for receiving the output of said output leads.

5. A receiver for the reception of alternating current signals from a plurality of signal sources comprising in combination a plurality of pulse train sources each characterising a different signal source, means for modulating a pulse train characteristic of a source with signals emanating from the source, amplitude comparison means to which the output of each said modulator is applied, means for deriving from the output of said amplitude comparison means time spaced pulses whose time spacing is determined by the frequency of said signals, a source of timing pulses, a pulse counting circuit connected to said timing pulse source, a connection from a counting circuit to said time spaced pulse deriving means, a plurality of output leads from said counting circuit, a coincidence gate circuit in each output lead, connection between said coincidence gate circuits and said pulse train sources, and a further counting circuit for receiving the output of said output leads, and further coincidence circuits actuated jointly by said further counting circuit and said pulse train sources.

6. A receiver for the reception of alternating current signals from a plurality of input circuits comprising in combination a plurality of pulse train amplitude modulators, a connection from each of said modulators to a different one of the input circuits which act as modulating inputs for the modulators, a plurality of sources of time spaced pulse trains, a connection from each of said sources to a different one of said modulators, the time position of each pulse train characterising the input circuit connected to the modulator to which the source of the pulse train is joined, a common signal circuit to which the modulated pulse outputs of all said modulators are connected, said common signal circuit comprising a pulse amplitude comparator circuit and an output lead connected to said comparator circuit, said comparator circuit being adapted to pass to said output lead only modulated pulses whose amplitude exceeds a predetermined value, and, connected to said output lead a circuit for deriving and transmitting to a further common signal circuit, a further train of time spaced pulses the pulses of which are coincident with pulses of said time spaced pulse trains, the time interval between successive pulses of said further train of time spaced pulses occurring at the same time position being indicative of the frequency of a signal being received by the input circuit characterised by that time position, and a timing circuit connected to said further common signal circuit for timing said time intervals.

7. A receiver for the reception of alternating current signals from a plurality of input circuits comprising in combination a plurality of pulse train amplitude modulators, a connection from each of said modulators to a different one of the input circuits which act as modulating inputs for the modulators, a plurality of sources of time spaced pulse trains, a connection from each of said sources to a different one of said modulators, the time position of each pulse train characterising the input circuit connected to the modulator to which the source of the pulse train is joined, a common signal circuit to which the modulated pulse outputs of all said modulators are connected, said common signal circuit comprising a pulse amplitude comparator circuit and an output lead connected to said comparator circuit, said comparator circuit being adapted to pass to said output lead only modulated pulses whose amplitude exceeds a predetermined value, and, connected to said output lead a pulse suppression circuit and a further common signal circuit connected thereto including a pulse suppression gate circuit having an inhibit connection from said pulse suppresson circuit, pulse transmission delay means connected to said output lead and to said pulse suppression gate circuit as an operate connection, whereby on said further common signal circuit appears a further train of time spaced pulses the pulses of which are coincident with pulses of said time spaced pulse trains, the time interval between successive pulses of said further train of time spaced pulses occurring at the same time position being indicative of the frequency of a signal being received by the input circuit characterised by that time position, and a timing circuit connected to said further common signal circuit for timing said time intervals.

8. A receiver for the reception of alternating current signals from a plurality of input circuits comprising in combination a plurality of pulse train amplitude modulators, a connection from each of said modulators to a different one of the input circuits which act as modulating inputs for the modulators, a plurality of sources of time spaced pulse trains, a connection from each of said sources to a different one of said modulators, the time position of each pulse train characterising the input circuit connected to the modulator to which the source of the pulse train is joined, a common signal circuit to which the modulated pulse outputs of all said modulators are connected, said common signal circuit comprising a pulse amplitude comparator circuit and an output lead connected to said comparator circuit, said comparator circuit being adapted to pass to said output lead only modulated pulses whose amplitude exceeds a predetermined value, and, connected to said output lead a circuit for deriving and transmitting to a further common signal circuit, a further train of time spaced pulses the pulses of which are coincident with pulses of said time spaced pulse trains, the time interval between successive pulses of said further train of time spaced pulses occurring at the same time position being indicative of the frequency of a signal being received by the input circuit characterised by that time position, means for timing said time interval and for producing an output when said interval coincides with a predetermined time interval and a counting circuit for counting said coincidences and producing an output after a predetermined number thereof.

9. A receiver for the reception of alternating current signals from a plurality of input circuits comprising in combination a plurality of pulse train amplitude modulators, a connection from each of said modulators to a different one of the input circuits which act as modulating inputs for the modulators, a plurality of sources of time spaced pulse trains, a connection from each of said sources to a different one of said modulators, the time position of each pulse train characterising the input circuit connected to the modulator to which the source of the pulse train is joined, a common signal circuit to which the modulated pulse outputs of all said modulators are connected, said common signal circuit comprising a pulse amplitude comparator circuit and an output lead connected to said comparator circuit, said comparator circuit being adapted to pass to said output lead only modulated pulses whose amplitude exceeds a predetermined value, and, connected to said output lead a circuit for deriving and transmitting to a further common signal circuit, a further train of time spaced pulses the pulses of which are coincident with pulses of said time spaced pulse trains, the time interval between successive pulses of said further train of time spaced pulses occurring at the same time position being indicative of the frequency of a signal being received by the input circuit characterised by that time position, timing means for timing said time interval and for producing an output when said time interval coincides with a predetermined time interval, a counting circuit for counting said coincidences, and a resetting circuit for resetting said counting circuit.

References Cited in the file of this patent

UNITED STATES PATENTS

| | | |
|---|---|---|
| 2,655,648 | Schrader | Oct. 13, 1953 |
| 2,680,152 | Creamer | June 1, 1954 |
| 2,721,899 | Krumhansl et al. | Oct. 25, 1955 |
| 2,727,946 | Cooke | Dec. 20, 1955 |
| 2,744,961 | Peek | May 8, 1956 |
| 2,774,817 | Earp | Dec. 18, 1956 |
| 2,784,255 | Earp | Mar. 5, 1957 |
| 2,784,256 | Cherry | Mar. 5, 1957 |
| 2,820,896 | Russell et al. | Jan. 21, 1958 |
| 2,862,186 | Aigrain | Nov. 25, 1958 |

FOREIGN PATENTS

| | | |
|---|---|---|
| 134,388 | Australia | Sept. 23, 1949 |